United States Patent
Patel

(10) Patent No.: US 10,167,837 B2
(45) Date of Patent: Jan. 1, 2019

(54) MOBILE TELEPHONE FOR REMOTE OPERATION

(71) Applicant: Dipam Patel, Dallas, TX (US)

(72) Inventor: Dipam Patel, Dallas, TX (US)

(*) Notice: Subject to any disclaimer, the term of this patent is extended or adjusted under 35 U.S.C. 154(b) by 0 days.

(21) Appl. No.: 15/725,561

(22) Filed: Oct. 5, 2017

(65) Prior Publication Data

US 2018/0045159 A1 Feb. 15, 2018

Related U.S. Application Data

(63) Continuation-in-part of application No. 14/607,166, filed on Jan. 28, 2015, which is a continuation of application No. 12/579,205, filed on Oct. 14, 2009, now Pat. No. 8,983,534.

(51) Int. Cl.
| | |
|---|---|
| *G07C 9/00* | (2006.01) |
| *F02N 11/08* | (2006.01) |
| *G08C 17/02* | (2006.01) |
| *H04M 1/725* | (2006.01) |

(52) U.S. Cl.
CPC ...... *F02N 11/0807* (2013.01); *G07C 9/00174* (2013.01); *G08C 17/02* (2013.01); *G08C 2201/93* (2013.01); *H04M 1/72533* (2013.01)

(58) Field of Classification Search
CPC . F02N 11/0807; G07C 9/00174; G08C 17/02; G08C 2201/93; H04M 1/72533
USPC ..................................................... 455/556.1
See application file for complete search history.

(56) References Cited

U.S. PATENT DOCUMENTS

| | | |
|---|---|---|
| 8,001,055 B2 | 8/2011 | Weiss |
| 8,237,554 B2 | 8/2012 | Miller et al. |
| 2003/0096594 A1 | 5/2003 | Naboulsi |
| 2005/0037734 A1 | 2/2005 | Tanaka et al. |
| 2005/0273219 A1 | 12/2005 | Kitao et al. |
| 2006/0143463 A1 | 6/2006 | Ikeda et al. |
| 2006/0148490 A1 | 7/2006 | Bates et al. |
| 2007/0032225 A1* | 2/2007 | Konicek ........... H04M 1/72513 455/417 |
| 2007/0080933 A1* | 4/2007 | Chen .................... G06F 1/1632 345/156 |
| 2007/0096938 A1 | 5/2007 | Lopez et al. |
| 2007/0100514 A1 | 5/2007 | Park |
| 2008/0057929 A1 | 3/2008 | Min |
| 2008/0171579 A1 | 7/2008 | Grubek |
| 2008/0194291 A1 | 8/2008 | Martin et al. |
| 2008/0194292 A1 | 8/2008 | Naito et al. |
| 2008/0200209 A1 | 8/2008 | Cahoon |
| 2008/0303630 A1 | 12/2008 | Martinez |
| 2009/0184800 A1 | 7/2009 | Harris |

(Continued)

FOREIGN PATENT DOCUMENTS

| | | |
|---|---|---|
| JP | 2007181119 A | 7/2007 |
| WO | 0108115 A1 | 2/2001 |

*Primary Examiner* — Kamran Afshar
*Assistant Examiner* — Nicole M Louis-Fils
(74) *Attorney, Agent, or Firm* — David W. Carstens; James H. Ortega; Carstens & Cahoon, LLP

(57) ABSTRACT

A mobile telephone capable of controlling a remote keyless system is provided. The mobile telephone is loaded with an executable program that enables the mobile telephone to control the remote keyless system using frequencies and systems already used by the remote keyless system. The complex functionality a mobile telephone allows the executable program to fully control remote keyless systems.

15 Claims, 3 Drawing Sheets

(56) References Cited

U.S. PATENT DOCUMENTS

| | | |
|---|---|---|
| 2009/0309697 A1* | 12/2009 | Miller .................... B60R 25/24 |
| | | 340/5.25 |
| 2010/0075655 A1 | 3/2010 | Howarter et al. |
| 2010/0171642 A1* | 7/2010 | Hassan ................ G01C 17/38 |
| | | 340/992 |
| 2011/0018793 A1 | 1/2011 | Chen et al. |
| 2011/0093161 A1* | 4/2011 | Zhou .................... B60W 50/08 |
| | | 701/31.4 |
| 2011/0093165 A1 | 4/2011 | Miller et al. |
| 2011/0258120 A1 | 10/2011 | Weiss |
| 2011/0275321 A1 | 11/2011 | Zhou et al. |

\* cited by examiner

MOBILE TELEPHONE FOR REMOTE OPERATION

PRIORITY CLAIM AND RELATED APPLICATIONS

This disclosure is a continuation-in-part application of U.S. patent application Ser. No. 14/607,166, filed Jan. 28, 2015, which is a continuation of U.S. patent application Ser. No. 12/579,205, filed Oct. 14, 2009, now U.S. Pat. No. 8,983,534, both of which are incorporated herein by reference in their entireties for all purposes.

TECHNICAL FIELD

The present invention relates to a method, system and apparatus for controlling a remote keyless system using a mobile telephone.

BACKGROUND

Remote keyless entry (RKE) systems are designed to permit or deny access by users to automobiles, homes, or buildings by engaging or disengaging locking mechanisms, but without the user having to physically contact the key with the locking mechanism. Remote keyless ignition (RKI) systems allow users to start the engine of an automobile or other motorized vehicle by engaging the vehicle's ignition system without the user having to physically contact the key with the ignition system.

FIG. 1 depicts a prior art remote keyless system for an automobile. Remote keyless systems operate by using a remote controller to broadcast electromagnetic waves which are received by the remote keyless system. If the system detects electromagnetic waves broadcast on the correct frequency or frequencies, and containing the correct code, remote keyless system actuates (engages or disengages) a locking mechanism or engages the engine ignition system. The electromagnetic waves are broadcast using a remote controller, such as a key fob, or circuitry built into the handle of a physical key, when a button on the remote controller is pressed.

Advanced remote keyless systems operate passively, without the need for physical manipulation of remote control buttons. Such systems automatically detect the proximity of a remote controller and interface with it. In the case of an automobile, the system detects when an approved remote controller is near the vehicle, and when the door handle is pulled, the actuator disengages the door lock. Similarly, if the system detects the remote controller within a specified range of the vehicle and the ignition button is pushed, the actuator starts the automobile's ignition system.

Accordingly, what is needed in the art is a remote keyless system, and related methods, that do not suffer from the deficiencies found in the prior art.

SUMMARY

The present invention is directed to a mobile telephone enabled to control a remote keyless system. An executable program is installed on the mobile telephone which allows it to control remote keyless systems installed in automobiles, homes or buildings, among other things, and allow users to perform functions similar to those performed using previous remote keyless controllers, in addition to other functions.

In one embodiment, the executable program uses the mobile telephone radio frequency transceivers to interact directly with and control an existing remote keyless system. In a preferred embodiment, the mobile telephone interacts with an existing remote keyless system using at least one Industrial, Scientific and Medical (ISM) radio frequency, such as Bluetooth. In another embodiment, the mobile telephone utilizes an internet connection or cellular connection to interact with a remote keyless system.

In one embodiment, the mobile telephone is capable of locking and unlocking doors. In another embodiment, the mobile telephone is capable of locking and unlocking a trunk or rear door of an automobile. In still another embodiment, the mobile telephone is capable of engaging a remote ignition system of a motorized vehicle. In another embodiment, the mobile telephone interface allows the user to interact with an automobile's onboard computer to manipulate other electronic functions of automobiles, including window movement, door movement, trunk movement, heating and air conditioning systems, interior and exterior lighting, audio systems, video systems, and the horn. In another embodiment, for a specific automobile, a first mobile telephone is capable of manipulating a first group of functions, and a second mobile telephone is capable of manipulating a second group of functions. In another embodiment, a single mobile telephone is capable of controlling multiple remote keyless systems.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
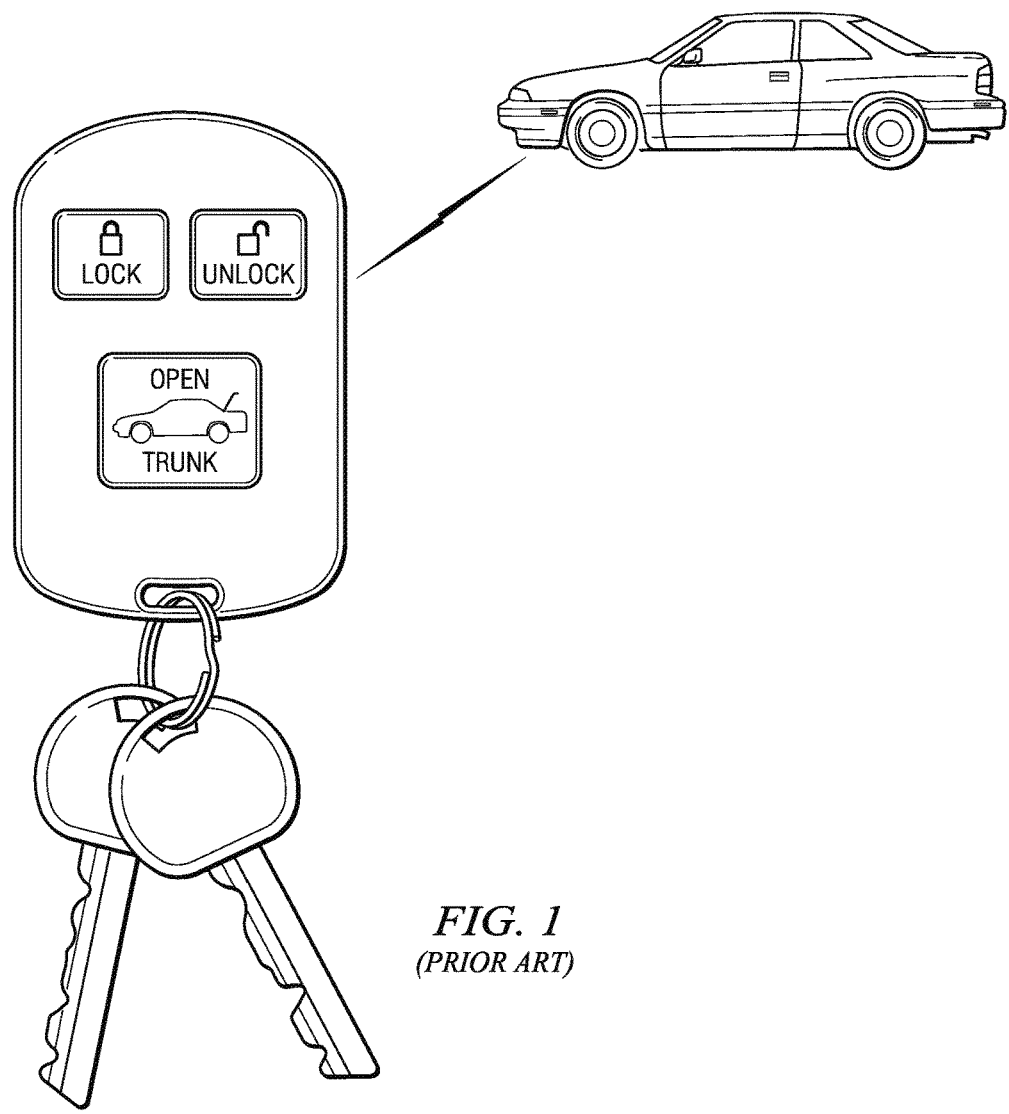
FIG. 1 is a depiction of a prior art remote keyless system.

The present invention relates to a method, system and apparatus for a mobile telephone to interact with a remote keyless system. The remote keyless system is a system that is installed in an automobile, a residence, or an office building and allows users to remotely control, typically by communication using radio frequency electromagnetic waves, certain functions connected to the remote keyless system. One embodiment of the present invention, therefore, is a mobile telephone loaded with an executable program that makes it backwards compatible with existing remote keyless systems. The present invention also relates to a method, system and apparatus for a mobile telephone to interact with and control the onboard computer of an automobile using its remote keyless system.

The starting point for all embodiments of the present invention is a mobile telephone (or mobile phone). As used herein, a mobile telephone is a long-range, electronic handset device used for mobile telecommunications (mobile telephony, text messaging or data transmission) over a cellular network of specialized base stations known as cell sites. A mobile phone offers a wide area of service, and should not be confused with a cordless telephone, which is also a wireless telephone, but only offers telephony service within a limited range (e.g. within a home or an office) and only through a fixed line and a base station owned by the subscriber.

In a preferred embodiment, the mobile telephone is a mobile smartphone, which is a mobile telephone that offers advanced functionality similar to a personal computer. Preferably, the smartphone runs a complete operating system software package that provides a standardized interface and platform allowing developers to create applications which will run on the smartphone operating system. An application is an executable computer program installed on the smartphone. Smartphones are currently sold under trademarks such as iPhone, Palm and Blackberry. Applications are currently available from the Apple App Store, the Blackberry App World, and third party providers.

The mobile telephone of the present invention is a mobile telephone with an application installed on it that allows the user of the mobile telephone to interact with a remote keyless system, remote ignition system, or other remote system that is designed to communicate electronically with a remote controller using electromagnetic waves, typically in the radio frequency (RF) spectrum. The mobile telephone and the remote system must be able to send and receive RF signals over the same wavelength(s) or using the same or communications systems or protocols.

Most mobile telephones are able to send and receive signals over one or more frequencies in the Industrial, Scientific and Medical (ISM) spectrum band. The ISM band is determined by the International Telecommunication Union, Radiocommunications Sector (ITU-R). ISM frequency bands include those used for wireless local area networks (IEEE 802.11) and Bluetooth devices. Mobile telephones also utilize various cellular telephone bands, such as Global System for Mobile Communication (GSM) bands, among others. Some mobile telephones are also able to communicate (usually one-way) with Global Positioning System (GPS) satellites.

Figure 3:
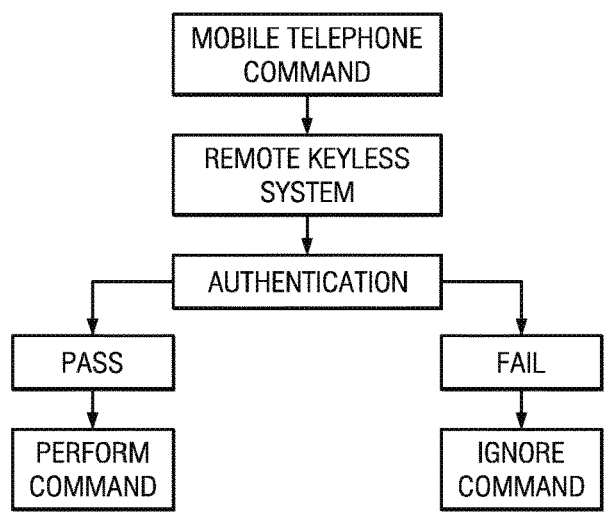
FIG. 3 is a flow chart depicting the general process flow for one embodiment of the present invention.

Many remote keyless systems also communicate over ISM frequency bands. In one embodiment of the present invention, an executable program is loaded onto a mobile telephone which allows it to interface and communicate with an existing remote keyless system over a specific ISM frequency band already used by the remote keyless system. In this embodiment, the mobile telephone replaces a remote controller or key fob that originally came with the remote keyless system. FIG. 3 is a basic flow chart depicting the command structure of one embodiment of the present invention, whereby a mobile telephone sends a command to a remote keyless system. The command is authenticated by the remote keyless system using encryption or other authentication methods, and if the command is deemed authentic, the remote keyless system executes the command.

Remote keyless systems typically employ at least one type of encryption method or encryption algorithm to prevent criminals from intercepting the signal and then spoofing it to gain access. One example of this is to use a "rolling code" that changes each time the remote keyless system is engaged or disengaged. The new code is determined by a microchip embedded in the remote controller. In one embodiment of the present invention, the executable program installed on the mobile telephone is designed to mimic the behavior of the encryption methods already used by the remote keyless system to prevent spoofing and theft. In another embodiment, the executable program improves on previous remote keyless systems by providing a means for "two-way" authentication and identification, where both the remote keyless system and mobile telephone satisfy predetermined authentication requirements, rather than the one-way authentication employed by previous remote keyless systems where only the remote controller is authenticated.

In a preferred embodiment, the remote keyless system uses the Bluetooth protocol to communicate with its remote controllers. Bluetooth is an open wireless protocol for exchanging data over short distances from fixed and mobile devices. Bluetooth uses frequency-hopping spread spectrum to split up the data being sent into packets, optionally encrypts the data using at least one encryption algorithm, and transmits the packets on up to 79 frequencies on the 2.4 GHz radio frequency bandwidth. Most mobile telephones with Bluetooth functionality are Class 2 Bluetooth devices, which gives them a range up to approximately 10 meters. In this case, a Bluetooth-capable mobile telephone is loaded with an executable program that enables the telephone to communicate with and control the remote keyless system.

In another embodiment, an executable program is loaded onto a mobile telephone that allows the telephone to wirelessly communicate with and control an automobile's onboard computer. In prior art remote keyless systems for automobiles, the functionality is generally limited to lock/unlock and remote start capabilities. This limitation is a function of the number and type of buttons included on the remote controller, and the desire to limit the costs of the system. One embodiment of the present invention overcomes these limitations by loading an executable program onto a mobile smartphone with a large screen and complex interface capabilities, which is designed to interact with and control many of the automobile's functions, including manipulating the lights, the air conditioning and heating system, the horn, the audio system, the video system (if any), door movement systems, window movement systems, or any other electrical components that can be controlled by the automobile's onboard computer. In another embodiment, the executable program allows a mobile telephone having voice activated functionality to communicate with a remote keyless system using voice commands from the user.

Figure 2:
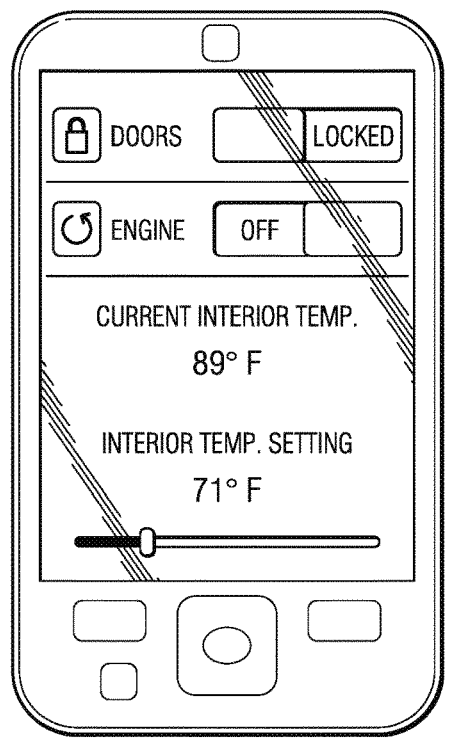
FIG. 2 is a depiction of the interface screen for one embodiment of the present invention.

In one embodiment, the executable program comprises a number of virtual toggle switches and slide bars which allow the user to manipulate any of the various functions of the automobile. FIG. 2 is a depiction of a preferred embodiment of the present invention. Depicted therein is an example of a menu screen and interface displayed by an executable program loaded onto an Apple iPhone which is designed to control the electronic functions of an automobile through its onboard computer. Toggle switches are capable of controlling the engine ignition system and the door locks, and a slide bar controls the interior temperature of the automobile by manipulating the air conditioning and heating system settings.

In another embodiment, an executable program is loaded onto a mobile telephone that is designed to interface with an automobile equipped with a subscription-based, cellular equipped communications and vehicle security system such as GM's OnStar, BMW Assist, Mercedes-Benz TeleAid, Lexus Link, or a similar such system. With the current cellular-based communications and vehicle security systems, if the car owner locks the keys in the car, the vehicle owner can call an agent associated with these systems and have the vehicle remotely unlocked. In one embodiment of the present invention, the executable program bypasses the human involvement using encryption and/or password technology to allow a user to lock and unlock the doors of the vehicle using their mobile telephone. In another embodiment, the user logs onto a website using the internet browser function of a mobile smartphone, which allows the user to communicate with the cellular-based communications and vehicle security system directly, bypassing human involvement. In still another embodiment, the executable program allows the user to manipulate all of the automobile's electronic functions through the onboard computer. This embodiment of the invention is also useful in the case of stolen vehicles because the executable program on the mobile telephone could be used to cut off the vehicle's ignition system or perform other functions to foil the theft of a vehicle.

In another embodiment, an executable program is loaded onto a mobile telephone that allows it to function as a proximity-based hands-free (passive) remote controller. In this embodiment, a remote keyless system will detect the presence of the mobile telephone using, for example, Bluetooth protocols, whereas the embodiments described above typically require some action on the part of the user (e.g., pressing a button or touching the mobile phone screen) to control the remote keyless system. If the mobile telephone is properly equipped with an executable program of the present invention that identifies the mobile telephone owner as a person authorized to access the system, it will allow said owner to manipulate the functions it controls. For example, if a remote keyless system recognizes a mobile telephone of the present invention, and the owner of the vehicle pulls on a door handle of a locked door connected to the system, the remote keyless system will unlock the door before the door handle has been fully actuated, allowing the mobile telephone owner access to the door.

In another embodiment, the remote keyless system is a remote keyless ignition system for an automobile, and the mobile telephone is loaded with an executable program that allows the telephone to act as a passive ignition key. In one embodiment, the executable program and remote ignition system are designed to only allow the vehicle's ignition to be started from within a certain range of the automobile. In another embodiment, security concerns may dictate that the vehicle's engine can only be started if the mobile telephone owner is actually in the passenger compartment of the vehicle. If the executable program is utilizing a cellular-based system (such as OnStar or BMW Assist) to control the vehicle's onboard computer, then theoretically the vehicle's engine could be started from anywhere in range of a cellular signal. Therefore, non-cellular proximity detection method must be employed. In one embodiment, the remote keyless system employs a Class 2 Bluetooth device, which is able to detect the presence of the mobile telephone of the present invention within about 10 meters. If a practitioner of the present invention wanted to limit the remote ignition functionality to only such times as the telephone is located within the passenger compartment, the remote keyless system employs a centrally located Class 3 Bluetooth device, which will detect the presence of the mobile telephone of the present invention within about 1 meter—roughly the size of an automobile passenger cabin. For larger vehicles, a plurality of Class 3 Bluetooth access points can be dispersed throughout the vehicle cabin to give full coverage. In another embodiment, a GPS-capable mobile telephone can send its GPS coordinates to the remote keyless system to determine whether the mobile telephone is within adequate proximity to the vehicle to allow remote start functionality. Other geolocation technology can also be used, such as cellular tower triangulation, or triangulation between several Bluetooth access points distributed throughout the vehicle.

Figure 4:
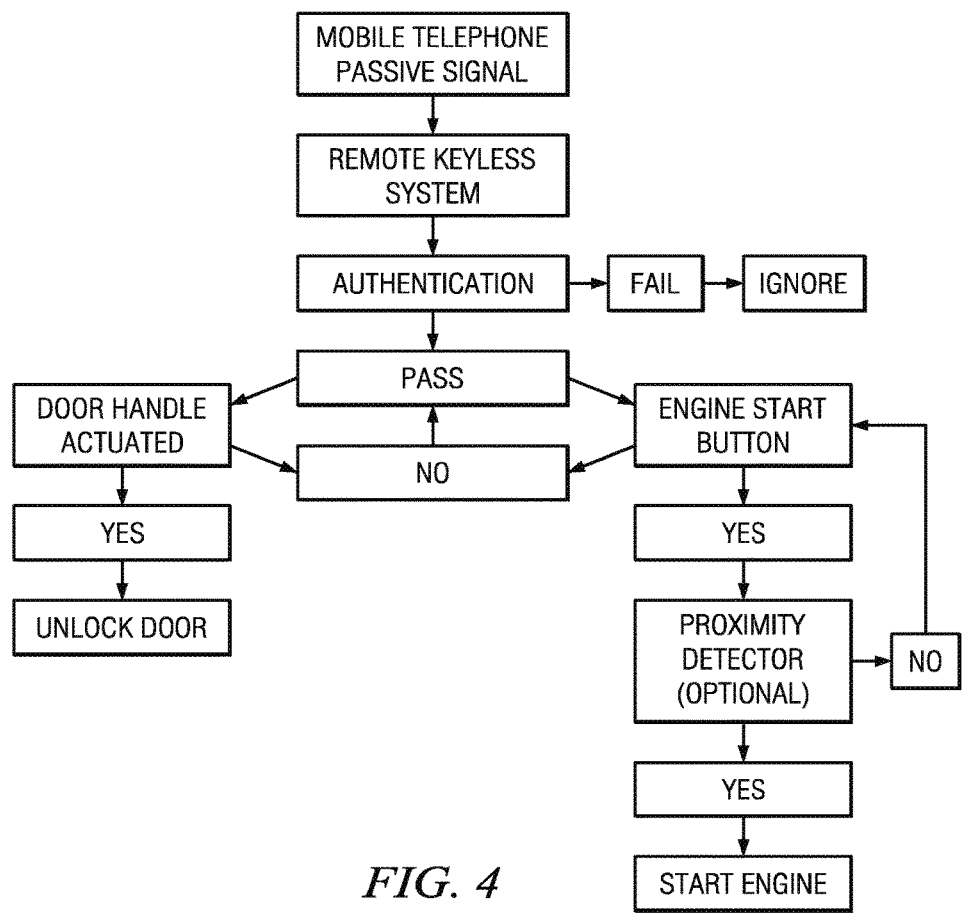
FIG. 4 is a flow chart depicting a more detailed process flow for one embodiment of the present invention.

FIG. 4 is a flow chart detailing the command structure for one embodiment of the present invention whereby the mobile telephone passively communicates with the remote keyless system. The passive signal sent from the mobile telephone is authenticated by the remote keyless system, and then responds to either a door handle actuation, or an engine start button push, as detailed in the flow chart.

In another embodiment, a first mobile telephone is loaded with a first executable program capable of manipulating a first group of functions controlled by a remote keyless system, and a second mobile telephone is loaded with a second executable program capable of manipulating a second group of functions controlled by said remote keyless system, which is different from said first group of functions. This embodiment of the present invention is useful when the owner of the remote keyless system wants to limit specific users to specific functions of the remote keyless system. For example, a mother or father can have an executable program loaded onto their mobile telephone which allows them to remotely lock and unlock a vehicle's doors, and remotely start the vehicle's engine. At the same time, the mother or father can allow a child's mobile telephone to be loaded with an executable program which only allows the child to lock and unlock the doors, and does not allow the child to start the vehicle's engine. Similar functionality divisions may be useful to certain businesses that allow employees access to company vehicles. The present invention contemplates any number of different mobile telephones capable of controlling any number of different functions of a remote keyless system.

In another embodiment, a mobile telephone is loaded with at least one executable program which allows the mobile telephone to control a plurality of remote keyless systems. For example, a person's mobile telephone is programmed to allow the person access to both his or her vehicle's remote keyless system and their spouse's vehicle's remote keyless system. The person's mobile telephone may also be programmed to control a remote keyless system for a garage door, an office building, or any other remote keyless system for which a separate remote control must typically be employed.

In another embodiment, the mobile telephone is loaded with an executable program that acts as a car locator. Using GPS systems of the telephone and/or automobile, or similar technologies such as triangulation, the executable program guides the user to the location of the parked automobile. The executable program can incorporate maps and other directional guides, including voice commands, to instruct the user where to find the parked automobile.

In still another embodiment, the mobile telephone is loaded with an executable program that deactivates or disables at least one function of the mobile telephone. Mobile telephones, and especially smartphones, are adding advanced entertainment, communication and productivity capabilities at an increasing rate. However, use of these advanced capabilities while driving can be extremely dangerous. Recent research in the United States has indicated that sending text messages while driving increases the likelihood of injury or death. Also, in 2008, almost 6,000 people were killed, and more than 500,000 people were injured, due to distracted driving. The present invention can be used to increase the safety of driving with a mobile telephone.

In one embodiment, if the mobile telephone of the present invention is used to start the engine of an automobile, an executable program is designed to disable one or more functions of the mobile telephone, such as text messaging, internet browsing, or telephony. In one embodiment, all functions of the mobile telephone are disabled. In another embodiment, all functions of the mobile telephone are disabled except for hands-free calling. In still another embodiment, only text messaging and/or internet browsing are disabled.

Additionally, the executable program may be configured to inform callers or senders of messages to the user whose mobile telephone was used to start the vehicle of the user's status. Specifically, once the user's mobile telephone has been used to start the engine of the vehicle, alternatively or in addition to disabling one or more functions of the user's telephone, such as messaging or telephony functionality, the executable program may be configured to cause the user's telephone to transmit an indication to such callers or senders of messages that the user is currently occupied operating the vehicle. Such an indication may be similar to an "out of office" reply message typically used by email software in response to the telephone receiving a sender's call or message directed to the user. Such a reply message may also be verbal in the event of a call to the user's telephone in such situations. Also, the executable program may be configured to employ a so-called "busy typing" technology of the user's telephone to inform a would-be sender of a message to the user. Such technology could be similar to the technology, sometimes referred to as "bubbles" or "dots" used by Apple's iPhone® to indicate to a would-be sender of a text message that the intended receiver of that message is currently typing their own message.

However, as implemented by the executable program, instead of the common "bubbles" indicating the user is currently typing their own message to the would-be message sender, the program could cause a different, unique indicator to the sender. Such a unique indicator could be an icon of a car to indicate that the user is operating a car at the time the would-be sender of the message is typing their message for the user. Alternatively or additionally, such an icon or other visual indicator may even be made to appear in the caller's/sender's contact list next to the entry of the user, which would thus provide such indication to the user ahead of time. Of course, any type of indicator, pictorial, textual or otherwise may also be employed by an executable program in accordance with the disclosed principles.

Still further, such system to inform caller or message senders that the user is operating a vehicle may be configured to actually prevent the user's telephone from receiving the call or message altogether or it, in the case of a message, it may simply delay receipt of such a message (or notification of the receipt of the message to the user) until after the vehicle engine has been turned off by the user or perhaps that the movement of the user's telephone has been detected as being stopped. In some embodiments, such an indication system may simply be limited to information for the caller/sender such that it further includes an emergency override that the caller or sender could engage to cause the call or message to reach the user's telephone in spite of the indication.

The disabling functionality can also be tied to motion of the mobile telephone. Many mobile telephones are equipped with GPS capability, which can determine when the mobile telephone is in motion, and how fast it is traveling. In one embodiment, the disabling functionality of the executable program engages only when the mobile telephone used to start the automobile engine is in motion, according to its GPS or other similar functionality. Importantly, passengers in the automobile may also have mobile telephones which contain an executable program of the present invention which is able to communicate with the automobile's remote keyless system. These passengers should not have any functionality impaired, regardless of whether the car is in motion, so long as their mobile telephone is not used to start the automobile's engine.

In the numerous embodiments of the inventive subject matter disclosed herein, such embodiments may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are for description and illustration, rather than words of limitation. Changes may be made within the purview of the appended claims, as presently stated and as amended, without departing from the scope and spirit of the disclosure in all its aspects. Although this description makes reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A method for operating a remote keyless system installed on an automobile, the method comprising:
executing a first executable program on a first mobile telephone, the executing of the first executable program enabling said first mobile telephone to passively communicate with said remote keyless system to control a first group of functions of said remote keyless system when execution of said first executable program is automatically detected proximate to said remote keyless system, and
executing a second executable program on a second mobile telephone different that the first mobile telephone, the executing of the second executable program enabling said second mobile telephone to passively communicate with said remote keyless system to control a second group of functions of said remote keyless system when execution of said second executable program is automatically detected proximate to said remote keyless system and simultaneous with the detection of said execution of said first executable program, wherein said second group of functions comprises one or more, but less than all, of said first group of functions;

wherein said first group of functions comprises door lock, door unlock and remote start, and wherein said second group of functions comprises door lock and door unlock but not remote start.

2. The method of claim 1 wherein said executable programs comprise an encryption algorithm.

3. The method of claim 1 wherein said mobile telephones control said remote keyless system by sending and receiving data over a 2.4 GHz radio frequency band using frequency-hopping spread spectrum methods, and wherein said remote keyless system operates over a 2.4 GHz radio frequency band using frequency-hopping spread spectrum methods.

4. The method of claim 1 wherein said automobile comprises at least one system controlled by an onboard computer, wherein said onboard computer is controlled by said remote keyless system, and wherein said executable programs comprise an interface which allows a user of said mobile telephones to control said at least one function of said at least one system.

5. The method of claim 1 wherein said system is at least one of door lock system, air conditioning system, engine ignition system, heating system, audio system, video system, interior or exterior lighting system, horn, window movement, trunk movement, and door movement system.

6. A method in accordance with claim 1, wherein the executing of the first executable program further enabling said first mobile telephone to passively communicate with said remote keyless system to start the engine of the automobile when execution of said first executable program is automatically detected proximate to said remote keyless system of the vehicle.

7. A method in accordance with claim 6, wherein the proximity of the first executable program being detected by the remote keyless system further comprises a location of the first executable program being detected by the remote keyless system being detected within the passenger compartment of the vehicle having the remote keyless system.

8. A method in accordance with claim 6, wherein the first executable program is further configured to disable at least one functionality of said first mobile telephone used to start the engine of the vehicle.

9. A method in accordance with claim 8, wherein said at least one functionality disabled is at least one of text messaging, internet browsing, and telephony.

10. A method in accordance with claim 6, wherein the first executable program is further configurable by a user of the first mobile telephone to turn off the vehicle's engine.

11. A method in accordance with claim 1, wherein the first executable program is further configured to disable at least one functionality of said first mobile telephone when the first executable program determines that said first mobile telephone is in motion.

12. A method in accordance with claim 11, wherein said at least one functionality disabled is at least one of text messaging, internet browsing, and telephony.

13. A method in accordance with claim 11, wherein the first executable program determining that said mobile telephone is in motion comprises employing a GPS system of the first mobile telephone.

14. A method in accordance with claim 11, wherein the first executable program determining that said first mobile telephone is in motion comprises determining a speed at which the first mobile telephone is travelling.

15. A method in accordance with claim 1, wherein said control of a first group of functions and said control of a second group of functions comprises control based on one or more setting of said at least one system preset by a user associated with the first or second mobile telephone, respectively.

* * * * *